United States Patent [19]
Conrad et al.
[11] 4,455,488
[45] Jun. 19, 1984

[54] RADIATION DETECTOR

[75] Inventors: Bernhard Conrad; Johann Finkenzeller, both of Erlangen; Gerhard Küehn, Poxdorf; Wolfhart Lichtenberg, Reinbek, all of Fed. Rep. of Germany

[73] Assignee: Siemens Aktiengesellschaft, Berlin and Munich, Fed. Rep. of Germany

[21] Appl. No.: 361,990

[22] Filed: Mar. 25, 1982

[30] Foreign Application Priority Data

Apr. 10, 1981 [DE] Fed. Rep. of Germany ....... 3114692

[51] Int. Cl.$^{3}$ .............................................. G01T 1/18
[52] U.S. Cl. .................................... 250/385; 250/374
[58] Field of Search ................................ 250/374, 385

[56] References Cited

U.S. PATENT DOCUMENTS 4,031,396 6/1977 Whetten et al. .................... 250/385
4,161,655 7/1979 Cotic et al. ......................... 250/385
4,217,499 8/1980 Racz et al. .......................... 250/385
4,297,576 10/1981 Laval et al. ......................... 250/385

*Primary Examiner*—Janice A. Howell
*Attorney, Agent, or Firm*—Hill, Van Santen, Steadman & Simpson

[57] ABSTRACT

In an exemplary embodiment, a flat radiation beam is detected having a common electrode disposed parallel to the beam plane at one side and a common support with a series of individual conductors providing electrodes opposite successive portions of the common electrode and lying in a plane also parallel to the beam plane. The beam may be fan-shaped and the individual electrodes may be aligned with respective ray paths separated by uniform angular increments in the beam plane. The individual conductors and the connection thereof to the exterior of the detector housing may be formed on an insulator which can be folded into a T-shape for leading the supply conductors for alternate individual conductors toward terminals at opposite sides of the chamber.

2 Claims, 3 Drawing Figures

RADIATION DETECTOR

BACKGROUND OF THE INVENTION

The invention relates to a radiation detector for a flat radiation beam, comprising a pressure-tight closed chamber, filled with a gas which is under pressure, in which a number of electrodes are arranged whose connections are guided toward the exterior.

A radiation detector of this type is described in the German OS No. 2,642,741. In the case of the latter, the pressure chamber is filled with an inert gas, for example xenon. Due to the impinging radiation, an ionization of the gas occurs, so that, between two electrodes associated with one another to which a high voltage is connected, a current flows which is dependent upon the intensity of the impinging radiation. The electrodes are formed from plates which are arranged perpendicularly to the plane of the radiation beam in the form of a row in the radiation detector. Two adjacent electrodes respectively form a measuring channel. At the outputs of the measuring electrodes, signals are obtained which reproduce the radiation profile at the detector input.

Due to the design of the electrodes in the form of plates which are disposed perpendicularly to the plane of the radiation beam, the radiation striking the radiation detector in the region of the respective plate thickness is not detected.

SUMMARY OF THE INVENTION

The object underlying the invention resides in providing a radiation detector of the initially cited type such that the chamber is not subdivided perpendicularly to the plane of the radiation beam, i.e., that the entire radiation extending over the longitudinal extent of the radiation detector is uninterruptedly detected.

In accordance with the invention this object is achieved in that there is arranged, in the chamber, parallel to the plane of the radiation beam, a common electrode extending over the entire beam width, opposite which a row of individual electrodes is disposed at the distance in a plane likewise disposed parallel to the plane of the radiation beam, which individual electrodes are applied on a common support whereby the radiation impinges between the common electrode and the individual electrodes. In the case of the inventive radiation detector the electrodes associated with the individual measuring channels are arranged in one plane which is disposed parallel to the plane of the radiation beam. The radiation detector is not subdivided perpendicularly to the plane of the radiation beam.

In an expedient embodiment of the radiation detector the individual electrodes can be applied in the form of printed conductors on a printed circuit board of insulating material. The printed circuit board can be folded in such a fashion that, from one part exhibiting the signal feed lines and disposed perpendicularly to the plane of radiation beam, the part bearing the individual electrodes projects perpendicularly, and that the part bearing the signal feed lines is clamped in the housing of the radiation detector and, with the signal connections, projects from this housing toward the exterior.

The invention shall be explained in greater detail in the following on the basis of an exemplary embodiment illustrated on the accompanying drawing sheets; and other objects, features and advantages will be apparent from this detailed disclosure and from the appended claims.

DETAILED DESCRIPTION

Figure 2:
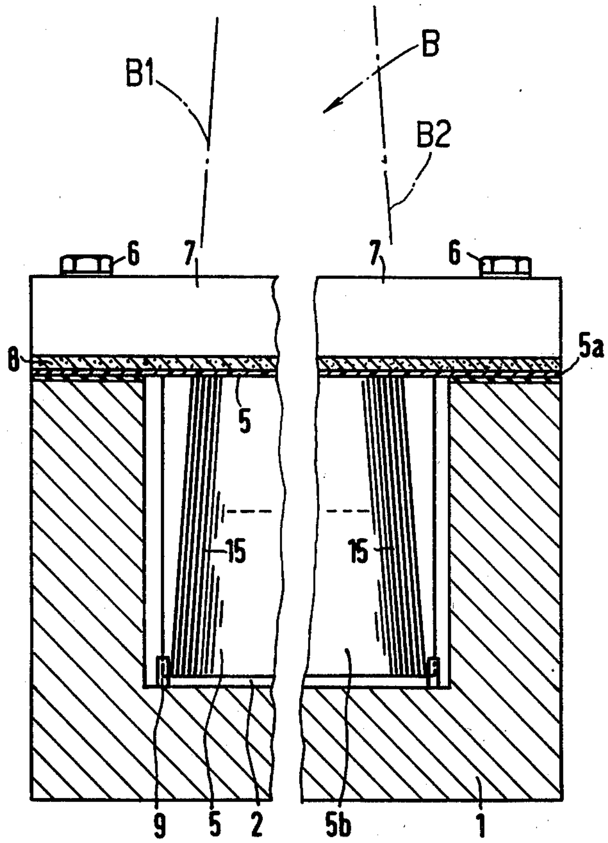
FIG. 2 illustrates fragmentary portions of a longitudinal section of the radiation detector according to FIG. 1.
Figure 1:
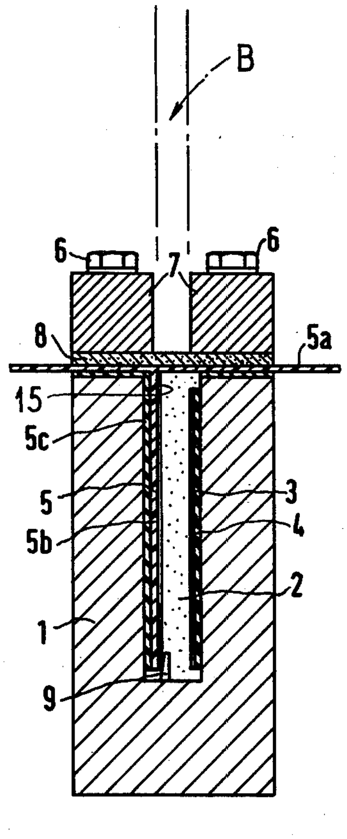
FIG. 1 illustrates a cross section of a radiation detector according to the invention.

In FIGS. 1 and 2, a housing part 1 of a radiation detector is illustrated which, for example, consists of aluminum and has an interior recess 2 in which the electrodes of the radiation detector are arranged. For the detection of the radiation intensity a common high voltage electrode 3 on an insulator 4 is present which extends over the entire width of a flat radiation beam B, for example a fan-shaped beam configuration having marginal rays B1 and B2, and is disposed parallel to the plane of the flat beam configuration. The arrangement 3, 4 is secured to the housing part 1. Accordingly, the beam plane in FIG. 1 is disposed perpendicularly to the drawing plane and, in FIG. 2, the beam plane is in the drawing plane. At a distance from the common electrode 3, and in a plane likewise disposed parallel to the beam plane, a series of individual electrodes is arranged. These individual electrodes are applied on a printed circuit board 5 of insulating material in the form of printed conductors and are visible in FIG. 2 as electrode strips 15. The electrode strips are aligned with respect to the focus of an x-ray tube according to the formation of the flat radiation beam in the form of a fan-shaped radiation beam. The printed circuit board 5 is folded in such a manner that, from a part 5*a* having the signal feed lines, and disposed perpendicularly to the beam plane, the part 5*b* bearing the individual electrodes projects perpendicularly. The parts 5*a*, 5*b* thus form a T configuration (as viewed in FIG. 1). Between the housing-side printed conductors of the parts 5*a*, 5*b* and the housing 1, an insulation layer 5*c* with a width corresponding to the width of the printed circuit board 5 is arranged. The part 5*a* bearing the signal supply lines is clamped in the housing of the radiation detector and, with the signal connections, projects from this housing 1 to the exterior thereof. For this purpose, part 5*a* is held by means of screws 6 and square cross section bars 7 with the aid of a carbon fiber plate 8, which tightly seals the interior recess 2 of the housing part 1 at the top side. The resulting sealed chamber provided by recess 2 is filled with xenon gas under pressure. At the base of the recess 2 lugs 9 are provided which are located outwardly of the printed conductors 15 and which hold the part 5*b*—projecting into recess 2—of the printed conductors 15 at a defined distance from the common electrode 3 without vignetting the ion current.

Figure 3:
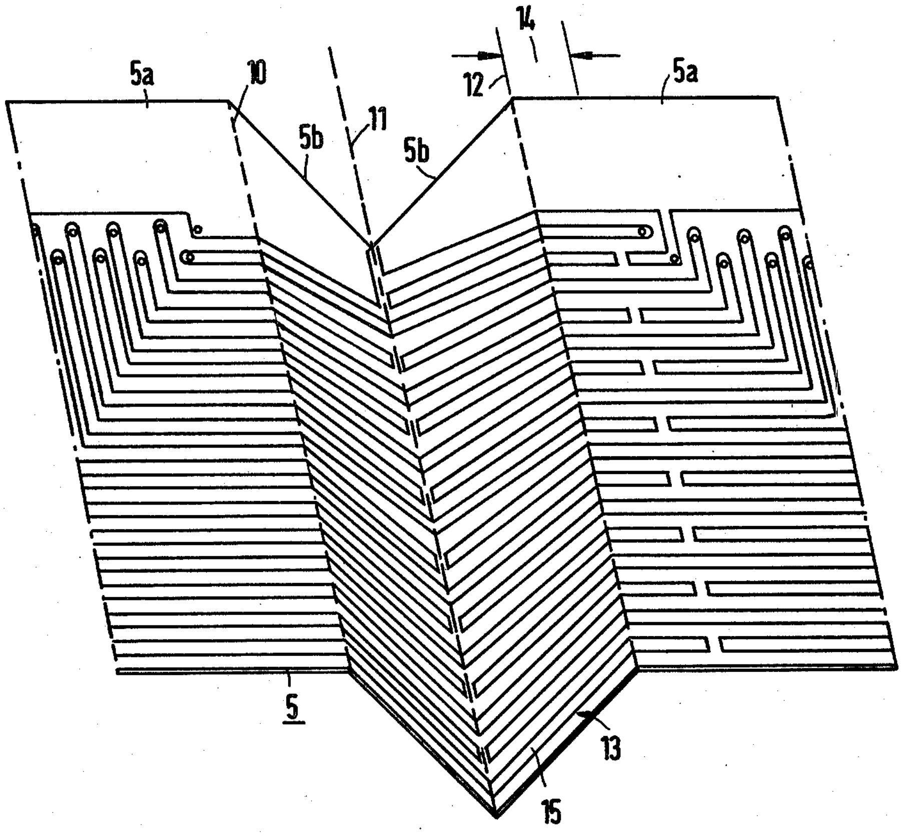
FIG. 3 illustrates a detail of the radiation detector according to the FIGS. 1 and 2 for the purpose of explaining the fabrication process.

From FIG. 3 the folding of the printed circuit board 5 is apparent. FIG. 3 shows that the individual electrodes 15 with their supply lines in printed technology are applied on a very thin printed circuit board which is folded about three mutually parallel straight lines 10, 11 and 12. In FIG. 3, the active part with the individual electrodes 15 supplying the signals is disposed on the side 13 of the printed circuit board 5. In the region 14, according to FIG. 1, the radiation also traverses the part 5a of the printed circuit board 5 before it enters the recess 2 of the housing 1. The region 14 of the part 5a of the printed circuit board 5 is, accordingly, a window region for the passage of the radiation.

From FIG. 3 it is clearly apparent that the signal connections for carrying away the signals arriving from the individual detectors, as well as for supplying possible shielding printed conductors, are guided toward the exterior.

It will be apparent that many modifications and variations may be made without departing from the scope of the teachings and concepts of the present invention.

We claim as our invention:

1. A radiation detector for a flat radiation beam, comprising a housing having a pressure-tight closed chamber, filled with a gas under pressure, electrode means arranged in the chamber and having electrical connections extending toward the exterior of the chamber, characterized in that said electrode means comprises a common electrode disposed in the chamber parallel to the beam plane, said common electrode extending over the entire beam width, a common support being arranged opposite said common electrode, and a series of individual electrodes applied to the common support so as to lie opposite said common electrode and in spaced parallel relation to said common electrode, characterized in that the individual electrodes are applied in the form of printed conductors, said common support comprising a printed circuit board of insulating material.

2. A radiation detector according to claim 1, characterized in that the printed circuit board is folded and comprises a first part having signal feed lines connecting with the individual electrodes, and disposed perpendicularly to the beam plane, a second part forming said common support and carrying the individual electrodes, and projecting perpendicularly relative to the first part, the first part carrying the signal feed lines being clamped in the housing of the radiation detector and, with the electrical connections extending from the housing toward the exterior.

* * * * *